United States Patent [19]

Ishii et al.

[11] Patent Number: 5,492,100
[45] Date of Patent: Feb. 20, 1996

[54] FUEL CONTROL DEVICE FOR ENGINE HAVING DISCONNECTABLE GROUPS OF CYLINDERS

[75] Inventors: Dairoku Ishii, Kyoto; Tetsuo Maeda, Himeji, both of Japan

[73] Assignees: Mitsubishi Jidosha Kogyo Kabushiki Kaisha; Mitsubishi Denki Kabushiki Kaisha, both of Tokyo, Japan

[21] Appl. No.: 481,143

[22] PCT Filed: Nov. 15, 1993

[86] PCT No.: PCT/JP93/01666

§ 371 Date: Sep. 15, 1994

§ 102(e) Date: Sep. 15, 1994

[87] PCT Pub. No.: WO94/11628

PCT Pub. Date: May 26, 1994

Related U.S. Application Data

[63] Continuation of Ser. No. 256,343, Sep. 15, 1994, abandoned.

[30] Foreign Application Priority Data

Nov. 16, 1992 [JP] Japan ..................... 4-305553

[51] Int. Cl.[6] ........................................ F02D 7/00
[52] U.S. Cl. ............................................ 123/481
[58] Field of Search ........................ 123/481, 480, 123/479, 198 F, 198 DB, 90.15, 90.16; 180/197; 364/431, 371

[56] References Cited

U.S. PATENT DOCUMENTS

| | | | |
|---|---|---|---|
| 4,552,114 | 11/1985 | Sano et al. | 123/481 |
| 4,637,363 | 1/1987 | Schmid | 123/481 |
| 4,781,160 | 11/1988 | Lohr et al. | 123/198 F |
| 4,951,773 | 8/1990 | Poirier et al. | 180/197 |
| 5,337,720 | 8/1994 | Murakami et al. | 123/481 |

FOREIGN PATENT DOCUMENTS

| | | | |
|---|---|---|---|
| 229847 | 7/1990 | Japan . | |
| 5195853 | 8/1993 | Japan . | |
| 6081679 | 3/1994 | Japan | 123/481 |

*Primary Examiner*—Raymond A. Nelli

[57] ABSTRACT

A fuel control device comprises a pair of valve change-over units KL and KH, an operation mode setting unit A1 for setting an engine in either a partial or full cylinder operation mode as a target operation mode according to engine operation data, a valve change-over controller A2 for controlling the valve change-over unit KL or KH to establish the target engine operation mode, a fuel supply unit FS to selectively supply fuel to active cylinders in the target engine operation mode, a mode change confirming unit A3 for confirming whether or not the engine is switched from the partial cylinder operation mode over to the full cylinder operation mode and issuing a mode change confirming signal, and a fuel supply controller A4 for operating the fuel supply unit FS in the partial cylinder operation mode when the partial cylinder operation mode is not successfully changed over to the full cylinder operation mode. Thus, the fuel control device forcibly operates the engine in the partial cylinder operation mode except when the full cylinder operation mode is reliably changed over to the partial cylinder operation mode.

11 Claims, 8 Drawing Sheets

FUEL CONTROL DEVICE FOR ENGINE HAVING DISCONNECTABLE GROUPS OF CYLINDERS

This application is a continuation of application Ser. No. 08/256,343 filed on Sep. 15, 1994, now abandoned.

FIELD OF THE INVENTION

This invention relates to a fuel control device for an internal combustion engine in which a valve system includes valve change-over mechanisms for selectively activating or de-activating intake and exhaust valves in a full or partial cylinder operation mode, and allows a fuel supply unit to supply fuel to active cylinders according to the full or partial cylinder operation mode.

DESCRIPTION OF THE RELATED ART

There are known internal combustion engines which include: valve change-over mechanisms for selectively operating low or high speed cams at appropriate timings so as to increase engine output; or valve change-over mechanisms for selectively operating low or high speed cams, operating valves by the selected cams, and allowing a partial cylinder operation mode by interrupting supply of intake air and fuel to only a part of cylinders, thereby increasing engine output and reducing fuel consumption.

A control device for such valve change-over mechanisms sets various operation modes according to engine operation condition data. For instance, part of the cylinders are disconnected in a partial cylinder operation mode by de-activating intake and exhaust valves of such cylinders and interrupting fuel supply thereto. At the completion of the partial cylinder operation mode, the disconnected cylinders become active with their intake and exhaust valves activated and fuel being supplied thereto. Further, in a full cylinder operation mode (with all the cylinders activated) at a low engine speed, low speed cams are used to operate the intake and exhaust valves so as to increase volume efficiency. Conversely, high speed cams are used to operate the valves in the full cylinder operation mode at a high engine speed, thereby increasing the volume efficiency.

The foregoing control device is required to quickly control the valve change-over mechanisms and the fuel supply system in response to various engine operating condition data. In the valve system, the valve change-over mechanisms are activated by solenoid valves or a hydraulic circuit driven by the solenoid valves. There is no trouble so long as the valve change-over mechanisms are very responsive to the engine operating conditions. The valve change-over mechanisms are, however, prone to poor response due to aging of components thereof.

When the partial cylinder operation mode is changed over to the full cylinder operation mode, the intake and exhaust valves of the disconnected cylinders resume their operation immediately. In this state, if the valve change-over mechanisms are slow to respond to such change of the engine operation mode due to malfunction of components thereof, the control device for the valve change-over mechanisms controls the valves for the full cylinder operation mode while the valve system may continue to operate the valves for the partial cylinder operation mode. In such a case, there will be no trouble if there is a sensor which can directly detect the operating conditions of the valves. However, such a sensor has not yet been available for practical use.

If the valve system operates for the partial cylinder operation mode but the fuel supply unit continues fuel supply to all the cylinders for the full cylinder operation mode, the fuel supplied to the disconnected cylinders would go into the continuously active cylinders via the surge tank and damage pistons or connecting rods thereof.

SUMMARY OF THE INVENTION

It is therefore an object of the invention to provide a fuel control device, which can continuously supply fuel only to the active cylinders in the partial cylinder operation mode except when it is confirmed that the valve system is fully responsive to the change-over from the partial cylinder operation mode to the full cylinder operation mode.

According to the invention, there is provided a fuel control device for an engine having disconnectable groups of cylinders, comprising: valve change-over units for selectively activating or de-activating at least either intake or exhaust valves of the engine; an operation mode selecting unit for selecting either a partial cylinder operation mode or a full cylinder operation mode, in which the intake or exhaust valves are selectively activated or de-activated, as a target operation mode on the basis of engine operating data; a valve change-over control unit for selectively operating the valve change-over units so as to operate the engine in the target operation mode selected by the operation mode selecting unit; a fuel supply unit for selectively supplying fuel to engine cylinders according to the selected target operation mode; a mode change confirming unit for confirming whether or not the partial cylinder operation mode is reliably changed over by the valve change-over units to the full cylinder operation mode, and issuing a mode change confirming signal; and a fuel supply control unit for controlling the fuel supply unit to operate in the partial cylinder operation mode when the target operation mode set by the operation mode selecting unit is the full cylinder operation mode and when the mode change confirming signal issued by the mode change confirming unit indicates incomplete change-over from the partial cylinder operation mode to the full cylinder operation mode.

The mode change confirming unit includes an operational parameter detecting unit for detecting current operational parameters of the engine and an operational parameter storing unit for storing, in advance, operational parameters obtained under varying operational conditions of the engine in the full cylinder operation mode. The operational parameters obtained under the operational condition corresponding to the operational condition under which the operational parameter detecting means actually detects the current operational parameters can be read from the stored operational parameters. Thus, the mode change confirming unit compares the actually detected current operational parameters with the operational parameters read from the operational parameter storing unit, thereby confirming whether or not the partial cylinder operation mode has been completely changed over to the full cylinder operation mode by the valve change-over units.

The mode change confirming unit further includes: a negative pressure sensor for detecting a negative pressure of an intake pipe, a throttle opening sensor for detecting opening of a throttle valve of the engine, and an engine speed sensor for detecting an engine speed. In this case, a negative pressure is an engine operational parameter, and throttle valve opening and an engine speed are operating conditions of the engine.

The mode change confirming unit compares current operational parameters of the engine with operational parameters for the full cylinder operation mode, thereby determining whether or not the partial cylinder operation mode is changed over to the full cylinder operation mode. Thus, it is possible to reliably detect incomplete operation mode change.

Further, the mode change confirming unit includes an engine operating condition detecting unit for detecting operating conditions of the engine, and suspends to determine whether the mode change is successful, when the detected engine operating conditions meet predetermined requirements for suspending the mode change confirmation. Thus, the mode change confirming unit prevents unnecessary fuel supply.

The engine operating condition detecting unit detects a temperature of the engine, and the mode change confirming unit suspends to determine whether the mode change is successful, when the detected engine temperature is below a preset reference value. Thus, the mode change confirming unit prevents unnecessary fuel supply.

The mode change confirming unit further includes a running condition checking unit for checking whether or not the vehicle is running. Predetermined requirements for suspending the confirmation of whether the mode change is successful are differentiated according to whether or not the vehicle is running. Thus, the mode change confirming unit prevents unnecessary fuel supply.

The mode change confirming unit suspends to confirm whether the mode change is successful on the basis of requirements depending upon whether or not the vehicle is running.

The engine operating condition detecting unit detects a status of a load applied to the engine. The mode change confirming unit suspends the confirmation of whether the mode change is successful, when the running condition checking unit does not determine that the vehicle is running and when the load is being applied to the engine.

The load may be applied by an air-conditioner.

The mode change confirming unit suspends the confirmation of whether the mode change is successful, when the load is active. Thus, unnecessary fuel supply can be prevented.

The engine operating condition detecting unit detects a throttle opening of the engine. The mode change confirming unit suspends the confirmation of whether the mode change is successful, when the running condition checking unit does not determine that the vehicle is running and when the detected throttle opening is larger than a preset reference value. Thus, the mode change confirming unit prevents unnecessary fuel supply.

Further, the engine operating condition detecting unit detects an engine speed. The mode change confirming unit suspends the confirmation of whether the mode change is successful, when the running condition checking unit does not determine that the vehicle is running and when the detected engine speed is not in a predetermined reference range. Thus, the mode change confirming unit prevents unnecessary fuel supply.

In addition, the fuel supply unit interrupts fuel supply to cylinders according to the operating condition of the engine, and the engine operating condition detecting unit detects the interruption of fuel supply by the fuel supply unit.

The mode change confirming unit suspends the confirmation of whether the mode change is successful, when the running condition checking unit determines that the vehicle is running and when interruption of the fuel supply is in progress, so that unnecessary fuel supply can be prevented.

DETAILED DESCRIPTION OF THE PREFERRED EMBODIMENT

Figure 1:
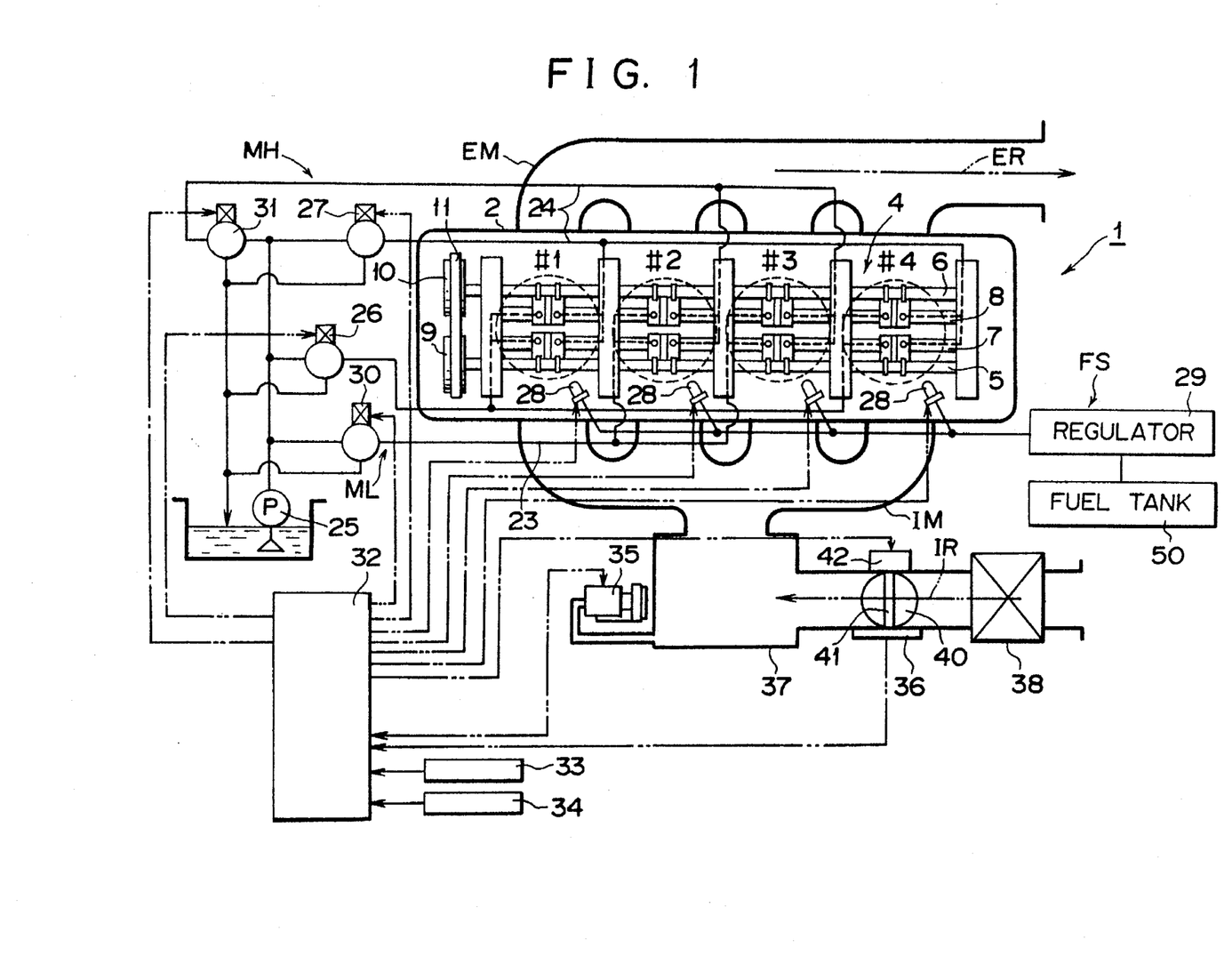
FIG. 1 is a schematic view showing the configuration of a fuel control device for an engine having disconnectable groups of cylinders according to an embodiment of the invention.

Referring to FIG. 1, a fuel control device according to an embodiment of the invention is applied to an in-line four-cylinder engine 1 including a DOHC type valve system. The engine 1 includes, on its cylinder head 2, an intake manifold IM communicating with respective cylinders, an intake pipe IR communicating with a surge tank 37 and an air cleaner 38, an exhaust manifold EM communicating with the cylinders, and an exhaust pipe ER connected to the exhaust manifold EM.

Figure 4A:
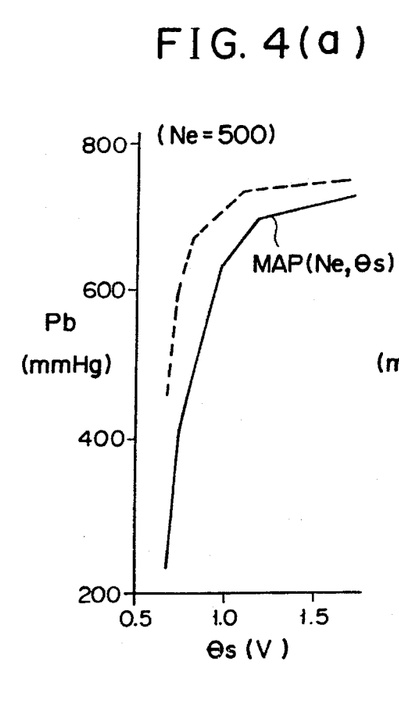
FIG. 4(a) is a graph showing a negative pressure Pb versus a throttle opening $\theta_s$ during the idling of the engine detected by a negative pressure sensor for the fuel control device of FIG. 1.
Figure 4B:
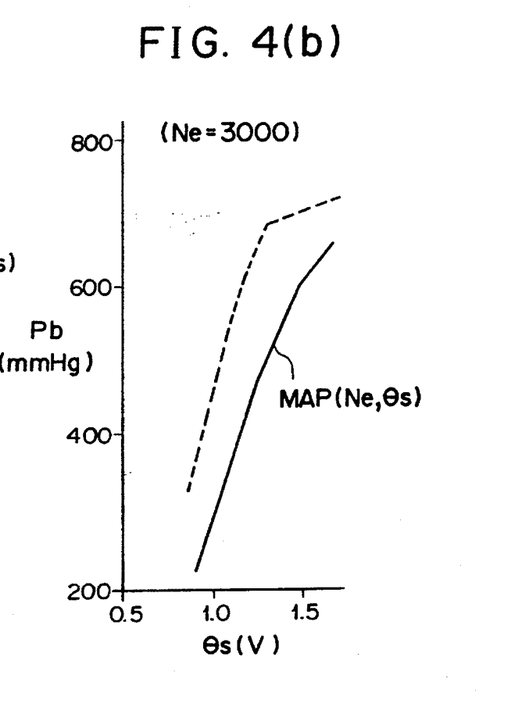
FIG. 4(b) is a graph similar to FIG. 4(a), but showing a negative pressure Pb versus throttle opening $\theta_s$ during an engine speed of 3000 rpm detected by the negative pressure sensor for the fuel control device of FIG. 1.

A throttle valve 40 is located downstream of the air cleaner 38 in the intake pipe IR. A rotary shaft 41 of the throttle valve 40 is actuated and rotated by a valve actuator 42 having a step motor. The valve actuator 42 is connected to and is controlled by an engine control unit ECU 32 to be described later. The throttle valve 40 includes a throttle valve opening sensor 36 for providing the ECU 32 with a throttle valve opening signal $\theta_s$ indicative of a throttle opening angle. A negative pressure sensor 35 is attached to the surge tank 37 in the intake pipe IR. Examples of data detected by the negative pressure sensor 35 are shown in FIGS. 4(a) and 4(b). Specifically, FIG. 4(a) is a graph showing the Pb-$\theta_s$ curves when the engine is idling while FIG. 4(b) is a graph showing the Pb-$\theta_s$ curves when the engine speed Ne is 3000 rpm. Further, in these drawing figures, dashed lines denote the Pb-$\theta_s$ curve during the partial cylinder operation mode, and solid lines denote the Pb-$\theta_s$ curve during the full cylinder operation mode.

Intake and exhaust ports (not shown) of the cylinders are opened and closed by intake valves and exhaust valves (not shown), respectively. These valves are operated by a valve system 4 of a well-known DOHC type. The valve system 4 includes intake and exhaust camshafts 5 and 6, and intake and exhaust rocker shafts 7 and 8, all of which are installed on the cylinder head 2. The camshafts 5 and 6 have timing gears 9 and 10 as integral parts at ends thereof, respectively. The timing gears 9 and 10 are connected to a crankshaft (not shown) via a timing belt 11 so that the camshafts 5 and 6 are rotated at half the engine speed. The intake and exhaust rocker shafts 7 and 8 are separately provided for the respective cylinders.

The intake and exhaust valves of all the cylinders are opened and closed by the valve system 4, which has a structure as disclosed and shown in the co-pending Japanese Patent Laid-open Application No. Hei 4-232,322 (Laid-Open publication No. Hei 6-081-679), for example.

The valve system 4 includes a valve change-over mechanism, which has a low speed cam selecting unit ML and a high speed cam selecting unit MH. The low speed cam selecting unit ML has a low speed solenoid valve 26 for intermittently connecting an oil path 23 to a hydraulic pump 25, and a low speed solenoid valve 30 for intermittently connecting the oil path 23 to the hydraulic pump 25. The low speed solenoid valve 26 serves for the cylinders #1 and #4, while the low speed solenoid valve 30 serves for the cylinders #2 and #3. Similarly, the high speed cam selecting unit MH has a high speed solenoid valve 27 for intermittently connecting an oil path 24 to the hydraulic pump 25, and a high speed solenoid valve 31 for intermittently connecting the oil path 24 to the hydraulic pump 25. The high speed solenoid valves 27 and 31 serve for the cylinders #1 and #4, and the cylinders #2 and #3, respectively. The hydraulic pump 25 communicates with an oil tank 50 as shown in FIG. 1.

The solenoid valves 26, 30, 27 and 31 are three-way valves, and are connected to the engine control unit ECU 32. When active, the valves 26, 30, 27 and 31 supply pressurized oil to hydraulic actuators (not shown). Conversely, when inactive, these valve connect the hydraulic actuators to drains.

The low and high speed cam selecting units ML and MH operate the intake and exhaust valves (not shown) in the low engine speed operation mode when the low and high speed solenoid valves 26, 30, 27 and 31 are inactive. Conversely, when all the solenoid valves 26, 30, 27 and 31 are active, the low and high speed cam selecting units ML and MH operate the intake and exhaust valves in the high engine speed mode.

When only the low speed solenoid valve 26 for the cylinders #1 and #4 is active, the partial cylinder operation mode is established by idly operating the intake and exhaust valves of these cylinders.

A fuel supply unit FS is installed on the cylinder head 2 shown in FIG. 1, and includes fuel injectors 28 and a regulator 29. The injectors 28 inject fuel to the intake ports (not shown) of the respective cylinders. The regulator 29 regulates fuel from a fuel tank 50 and supplies it to the injectors 28. The fuel supply unit FS is connected to the engine control unit ECU 32 which controls fuel injection.

The engine control unit ECU 32 mainly comprises a microcomputer, and performs various control functions such as checking operation mode data so as to select, as a target operation mode, the low speed operation mode using the low speed cams, the high speed operation mode using the high speed cams, or the partial cylinder operation mode with the cylinders #1 and #4 disconnected. The engine control unit ECU 32 issues a mode selection signal to change the current operation mode to the selected target operation mode, and controls the operation of the fuel injectors and ignition timing accordingly.

Figure 2:
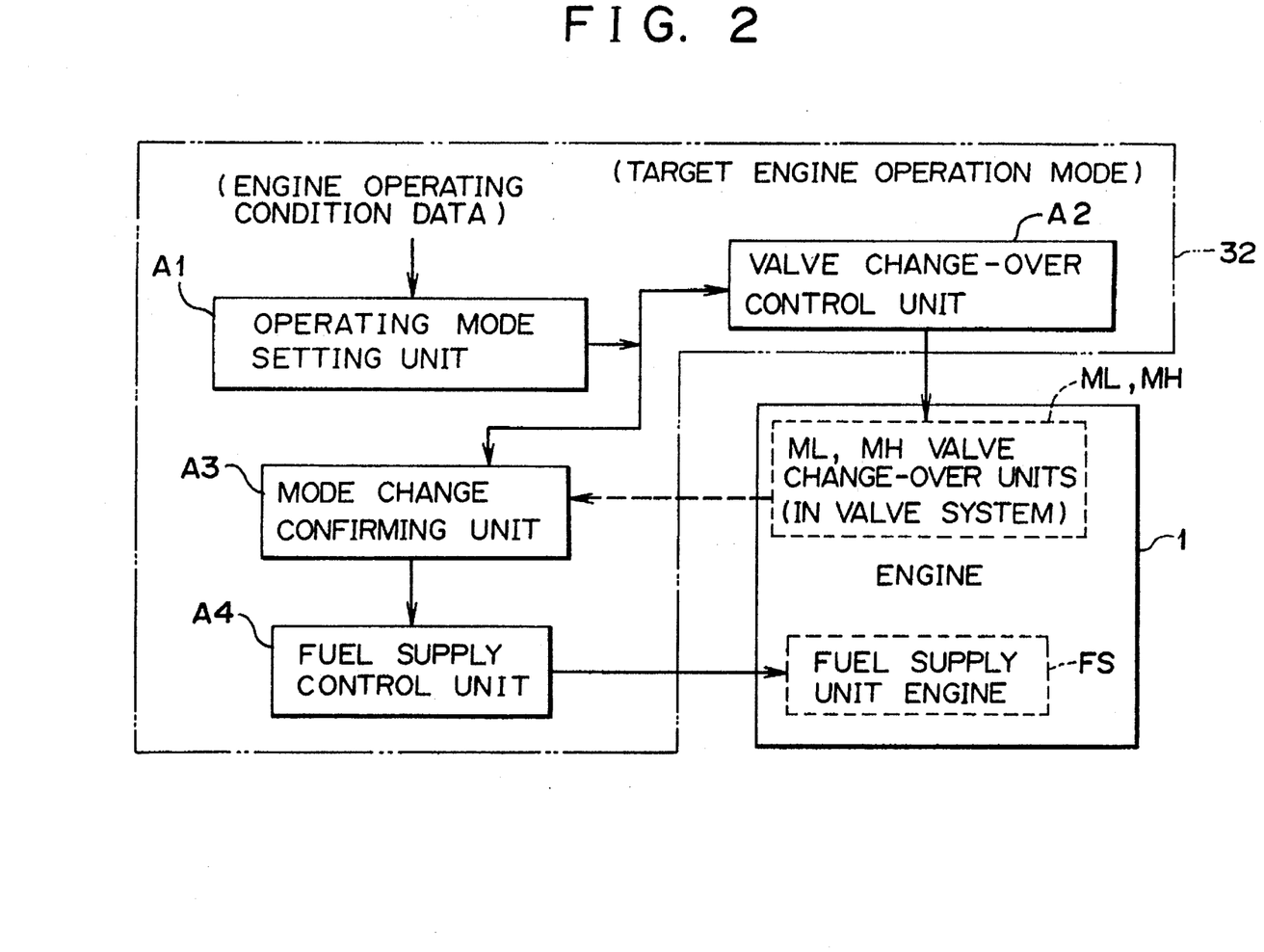
FIG. 2 is a block diagram of the fuel control device of FIG. 1.

The engine control unit ECU 32 functions as an operation mode selector A1, a valve change-over controller A2 for the valve change-over mechanism, an operation mode change confirming unit A3, and a fuel controller A4.

The operation mode selector A1 selects the full or partial cylinder operation mode as the target operation mode on the basis of operating condition data of the engine 1. The valve change-over controller A2 controls the operation of the low or high speed cam selecting unit ML or MH to establish the target operation mode selected by the operation mode selector A1. The operation mode change confirming unit A3 determines whether the partial cylinder operation mode has been changed over to the full cylinder operation mode by the low and high speed cam selecting units ML and MH, and issues a signal indicative of the completion of the operation mode change. The fuel controller A4 operates the fuel supply unit FS in the partial cylinder operation mode when the operation mode selector A1 selects the full cylinder operation mode as the target operation mode but when the operation mode change confirming unit A3 provides the signal indicative of the incompletion of the operation mode change.

Referring to FIG. 1, the engine control unit ECU 32 receives various operation data such as an engine speed Ne from an engine speed sensor 33 (i.e. a crank angle sensor), a cooling water temperature Twt from a temperature sensor 34, a negative intake air pressure Pb from a negative pressure sensor 35, and throttle opening $\theta_s$ from a throttle opening sensor 36.

The operation of the fuel control device of the invention will be described with reference to a logic flow shown in FIGS. 5 to 9.

Figure 5:
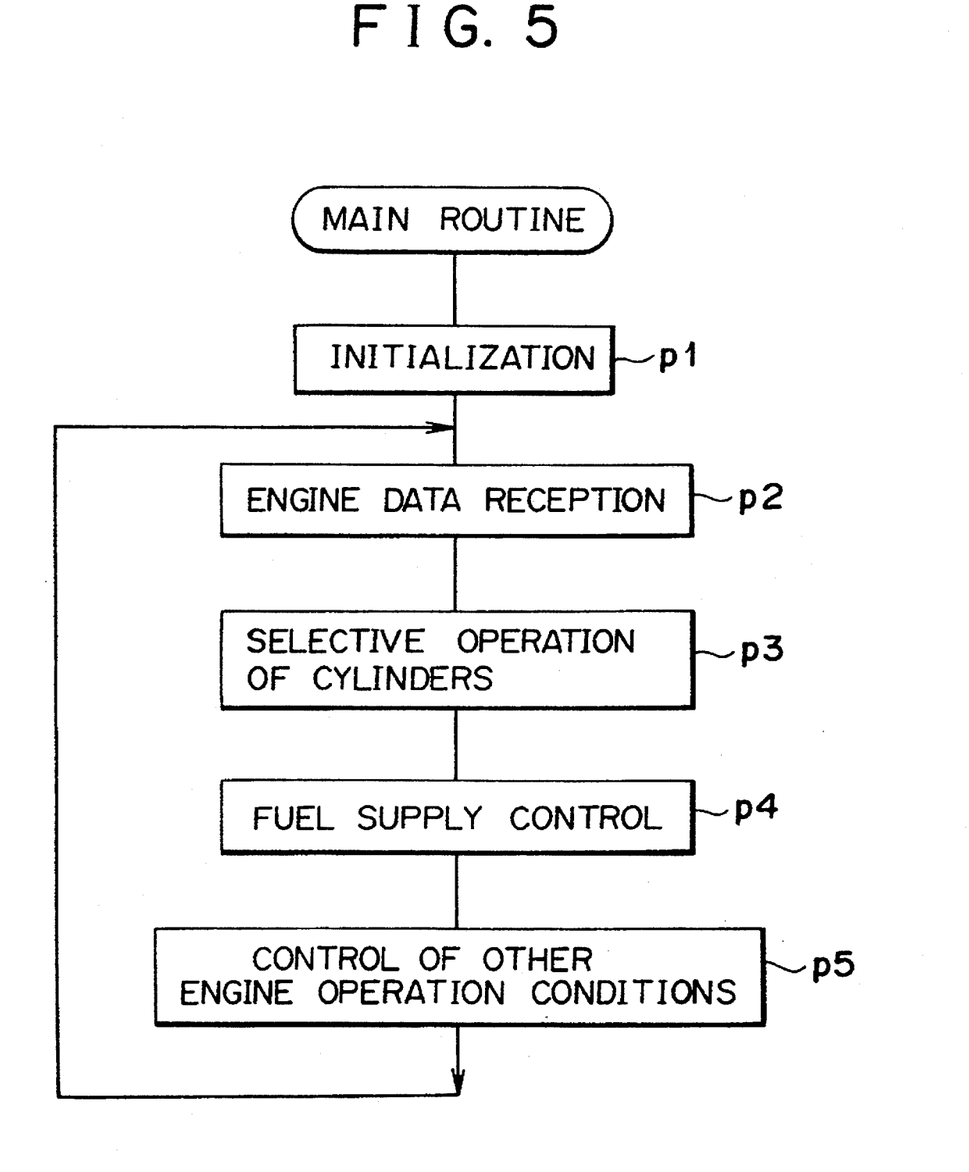
FIG. 5 is a flowchart of a main routine for the fuel control device of FIG. 1.

The actuation of a main switch (not shown) starts the logic flow, according to which the engine control unit ECU 32 performs its control operations in the main routine.

In step p1, the engine control unit ECU 32 checks various functions, performs initialization, and goes to step p2. In step p2, the engine control unit ECU 32 reads various engine operating data, and then goes to step p3, wherein the engine control unit ECU 32 controls the operation mode change in a well-known manner.

Figure 3:
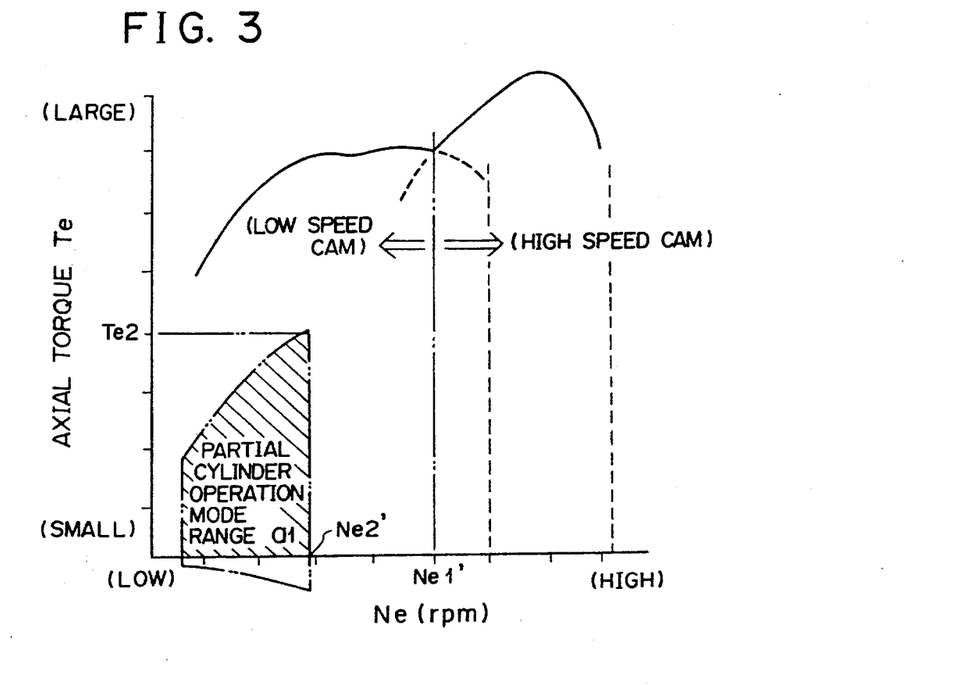
FIG. 3 is an operation mode map for the fuel control device of FIG. 1.

The engine control unit ECU 32 checks whether or not the engine is operating in a range a1 of the partial cylinder operation mode as shown in FIG. 3, on the basis of the engine operating data such as the engine speed Ne, an axial torque Te (which has been calculated on the basis of the negative pressure Pb and the engine speed N2 in a different routine), and a threshold value Ne2'. The engine control unit ECU 32 also checks the remaining requirements for the partial cylinder operation mode. When all the requirements are satisfied for the partial cylinder operation mode, the engine control unit ECU 32 activates only the low speed solenoid valve 26, but de-activates the other solenoid valves 30, 27 and 31. Then, the engine control unit ECU 32 returns to the main routine.

When the current engine speed Ne is lower than a threshold value Ne1' (shown in FIG. 3), the engine control unit ECU 32 selects the low speed mode. Otherwise, the engine control unit ECU 32 selects the high speed mode. For the low speed mode, all the solenoid valves 26, 30, 27 and 31 are de-activated. Conversely, for the high speed mode, all of these solenoid valves are activated. Then, the engine control unit ECU 32 returns to the main routine.

In step p4 of the main routine, the engine control unit ECU 32 controls a fuel supply process, performs other control operations in step p5, and then returns to step p2.

Figure 9:
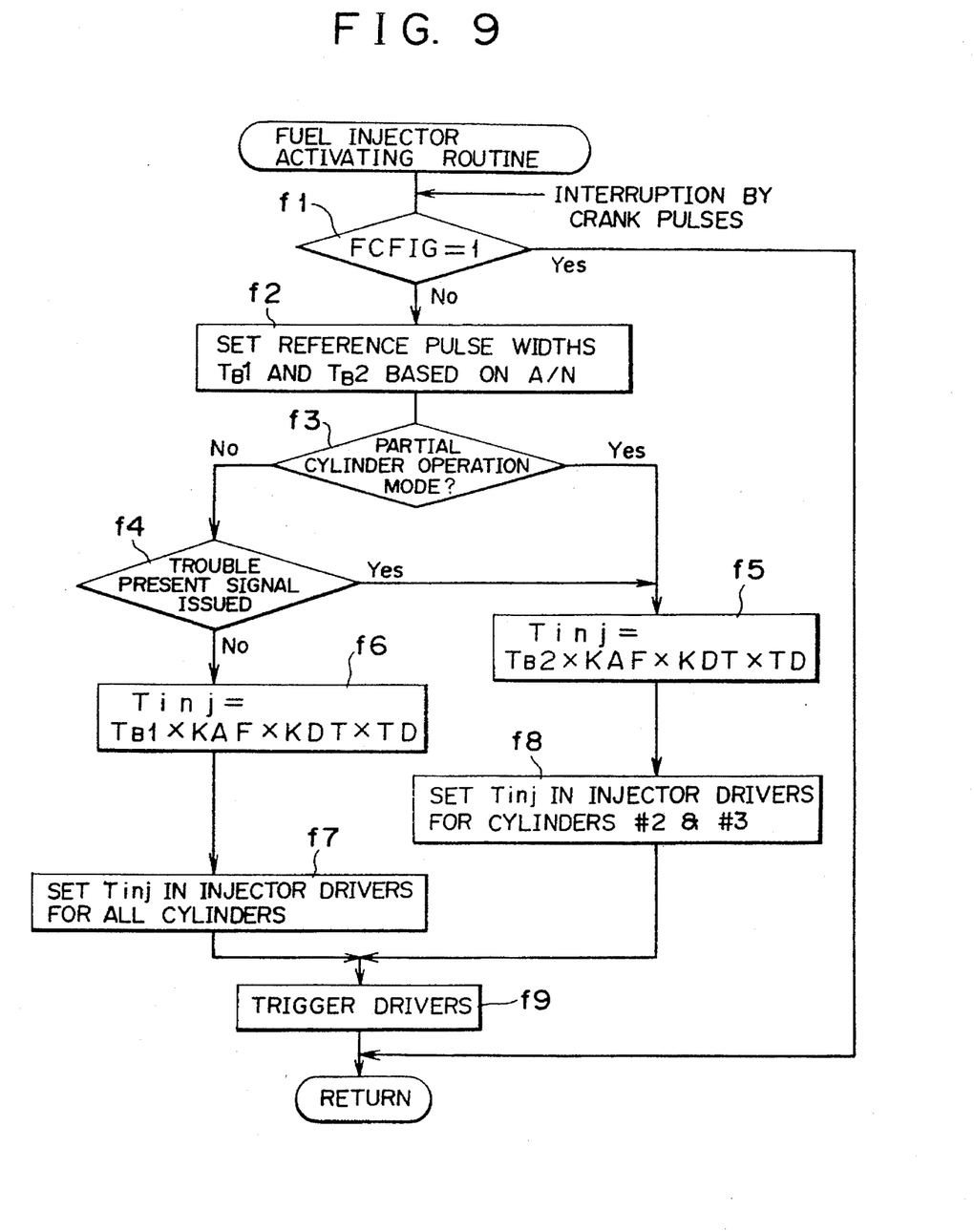
FIG. 9 is a flowchart of a fuel injector activating routine for the fuel control device of FIG. 1.

In the fuel supply control process, the engine control unit ECU 32 corrects fuel injection timing depending upon an air-fuel ratio, a cooling water temperature, an ambient temperature, an atmospheric pressure and so on, which will be used in an injector activating routine shown in FIG. 9. The injector activating routine is carried out at each crank pulse interruption which takes place during the intake stroke of the cylinders. In step f1, the engine control unit ECU 32 checks whether or not fuel-supply cutting is in progress for a part of the cylinders. When the fuel cutting is in progress, the engine control unit ECU 32 returns to the main routine. Otherwise, the engine control unit ECU 32 calculates a reference fuel injection pulse $T_B1$ for the full cylinder operation mode or a reference fuel injection pulse $T_B2$ for the partial cylinder operation mode depending upon current intake air amount data. In step f3, the engine control unit ECU 32 checks whether the partial or full cylinder operation mode is in progress. When the partial cylinder operation mode is in progress, the engine control unit ECU 32 proceeds to step f5. Otherwise, the engine control unit ECU 32 goes to step f4. In step f4, the engine control unit ECU 32 checks whether or not there is a signal indicative of an operation mode change trouble. In the presence of the trouble signal, the engine control unit ECU 32 goes to step f5. Otherwise, the engine control unit ECU 32 goes to step f6.

In step f6, the engine control unit ECU 32 receives the reference fuel injection pulse $T_B1$ for the full cylinder operation mode, and corrects the fuel injection timing depending upon the air-fuel ratio, the cooling water temperature, the ambient temperature, the atmospheric pressure and so on, and calculates a target injection period width $T_{inj}$. In steps f7 and f9, the engine control unit ECU 32 actuates the drivers for all the cylinders by means of a pulse having a width corresponding to the target injection period width $T_{inj}$, and permits the fuel injectors 28 to inject the fuel to the intake ports.

When it is determined in step f3 that the partial cylinder operation mode is in progress, the engine control unit ECU 32 goes to step f5. Sometimes, the engine control unit ECU 32 is forced to go to step f5 from step f4. In step f5, the engine control unit ECU 32 receives the reference fuel injection pulse $T_B2$ for the partial cylinder operation mode, corrects the fuel injection timing depending upon the air-fuel ratio, the cooling water temperature, the ambient temperature, the atmospheric pressure and so on, and calculates another target injection period width $T_{inj}$. In steps f8 and f9, the engine control unit ECU 32 activates the drivers only for the cylinders #2 and #3. Then, the injectors 28 inject fuel to the intake ports of the cylinders #2 and #3. Conversely, no fuel is injected into the cylinders #1 and #4.

Figure 6:
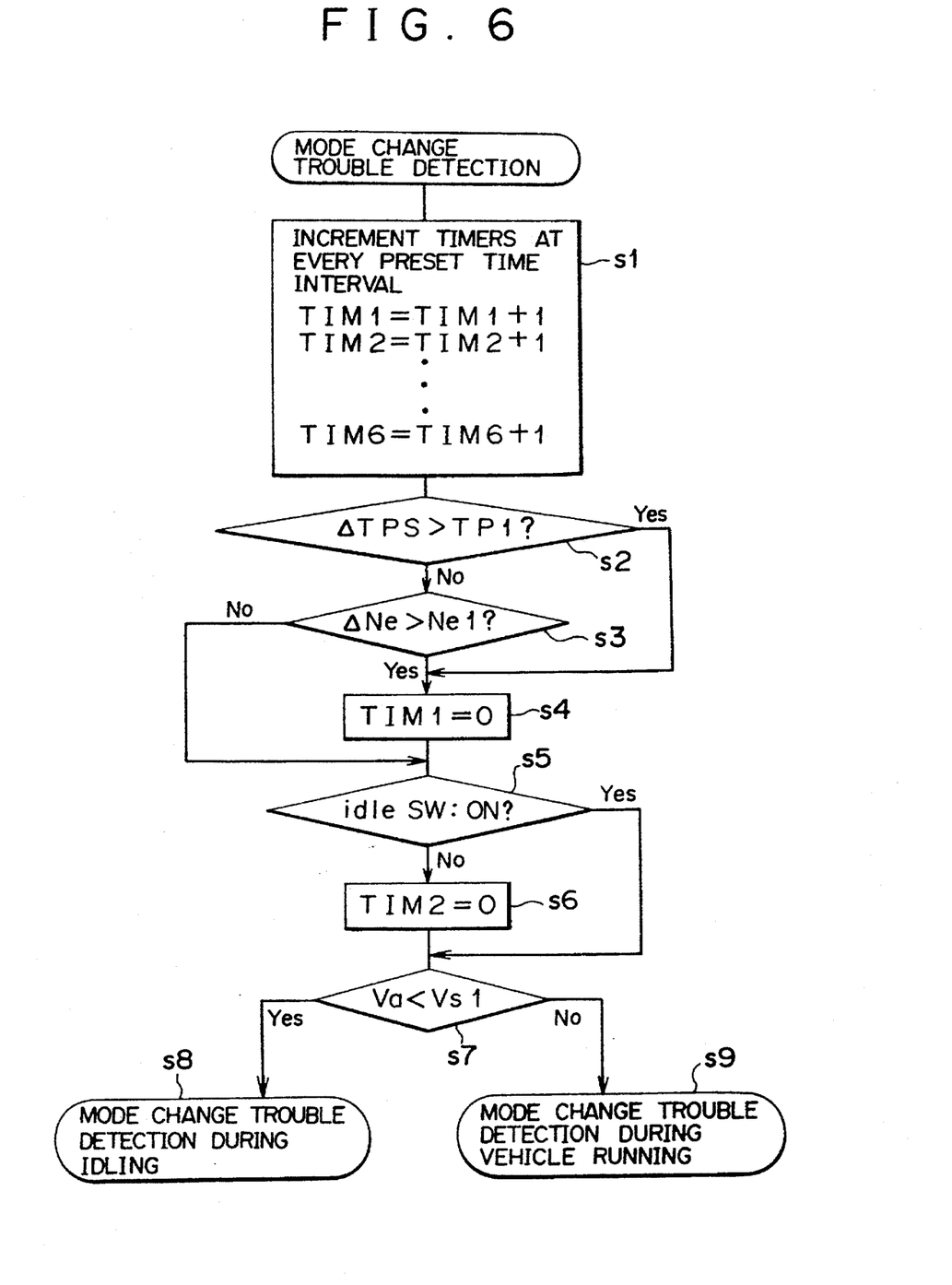
FIG. 6 is a flowchart of a mode change trouble detecting routine for the fuel control device of FIG. 1.

Troubles with the operation mode change will be detected in the mode change trouble detecting routine by interrupting the main routine at each predetermined crank angle.

In step s1 of this routine (shown in FIG. 6), the engine control unit ECU 32 increments respective timers TIM 1 to TIM 6 by one (1), and goes to step s2. In step s2, the engine control unit ECU 32 checks whether or not a throttle-opening changing speed $\Delta TPS$ is higher than a reference throttle-opening changing speed Tp1 indicative of acceleration. When $\Delta TPS$ is below Tp1, the engine control unit ECU 32 goes to step s3. When $\Delta TPS$ is determined, in step s3, to be extensively larger than Tp1, the engine control unit ECU 32 goes to step s4. In step s3, the engine control unit ECU 32 checks whether or not an engine-speed changing speed $\Delta Ne$ is higher than a reference engine-speed changing speed Ne1 indicative of acceleration. When $\Delta Ne$ is higher than Ne1, the engine control unit ECU 32 goes to step s4. Otherwise, the engine control unit ECU 32 goes to step s5. In step s4, the engine control unit ECU 32 resets the timer TIM1 for determining whether or not the engine operation is normal, and goes to step s5. In step s5, the engine control unit 32 checks, on the basis of the presence of a signal indicative of an on/off state of an idle switch (not shown), whether or not the engine is idling. When the engine is idling, the engine control unit ECU 32 allows the timer TIM2 (for counting a time period T2 during which confirmation of the mode change is inhibited after the actuation of the idle switch) to continue counting, and goes to step s7. When the engine goes out of idling, the engine control unit ECU 32 goes to step s6, and resets the timer TIM2. However, when a current vehicle speed Va is determined, in step s7, to be lower than a reference vehicle speed Vs1 indicative of idling (i.e. Va< Vs1), the engine control unit ECU 32 goes to step s8 to check whether or not a mode change trouble is present during the idling. Conversely, when Va> Vs1, the engine control unit ECU 32 goes to step s9, where it is checked whether or not the operation mode change trouble has occurred while the vehicle is running.

Figure 7:
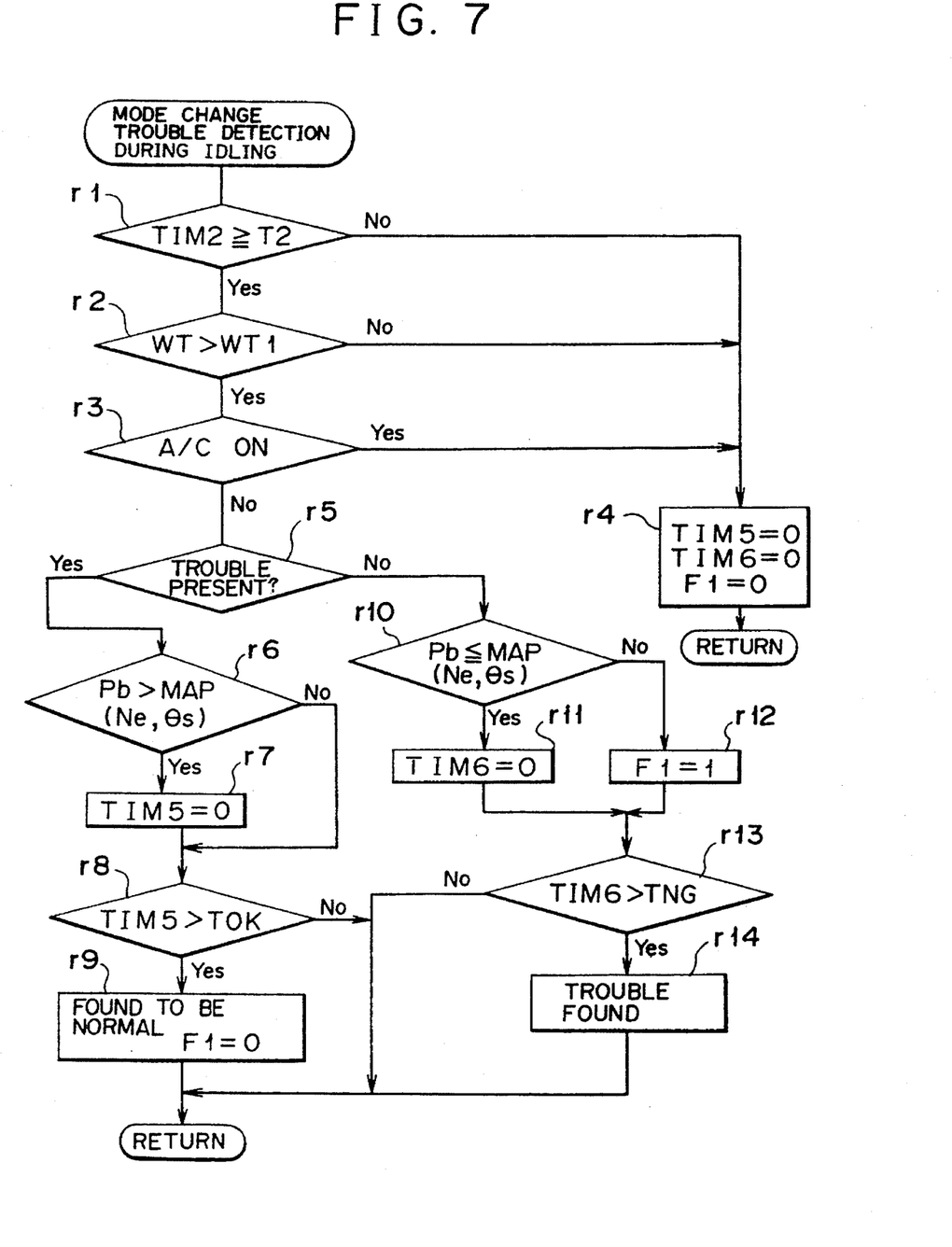
FIG. 7 is a flowchart of a mode change trouble detecting routine during the idling of the engine.

Referring to FIG. 7, a mode change trouble during the idling is detected and processed as follows. In step r1, the ECU 32 checks whether or not the timer TIM2 has counted the time period T2. When the time period T2 has not elapsed, the logic flow proceeds to step r4, wherein the engine control unit ECU 32 resets a timer TIM6 (for counting a time period for confirming that the mode change has been normally carried out with the engine idling), clears the timer TIM5 (for counting a time period for confirming that the mode change trouble has occurred during the idling), resets a trouble detecting flag F1, and returns to the main routine.

Conversely, when the timer TIM2 has counted time T2 in step r1, the ECU 32 goes to step r2. In step r2, the ECU 32 checks whether or not the current cooling water temperature WT is above a temperature WT1 (indicative of a temperature at which the confirmation of the mode change trouble is initiated). When WT is below WT1, the ECU 32 goes to step r4. Conversely, when WT is higher than WT1, the ECU 32 goes to step r3, where it checks whether or not an air conditioner is active. When the air conditioner is active, the ECU 32 goes to step r4. Otherwise, the ECU 32 goes to step r5. When the presence of the mode change trouble is confirmed in step r5, the ECU 32 goes to step r6. In step r6, the ECU 32 checks whether or not the current negative pressure Pb is above a negative pressure MAP (Ne, $\theta_s$) as shown in FIG. 4(*a*) or FIG. 4(*b*) depending upon the current engine speed and throttle opening. FIG. 4(*a*) is applicable in this case. The negative pressure MAP depends upon a current engine speed and throttle opening in the full cylinder operation mode, and is used as a criterion for detecting the mode change trouble. When Pb is above MAP, the ECU 32 goes to step r7, where it resets the timer TIM5. Conversely, when Pb is below MAP, the ECU 32 goes to step r8. In step r8, when a time period counted by the timer TIM5 is shorter than a time period TOK (a reference time period for confirming that the operation mode change has been normally performed), the ECU 32 returns to the main routine. On the other hand, when the time period counted by the timer TIM5 is above TOK, it is considered that the operation mode change trouble is cleared. Thus, the engine control unit ECU 32 resets a trouble determining flag F1 in step S9, and returns to the main routine.

On the other hand, when it is determined in step r5 that there is no mode change trouble, the logic flow proceeds to step r10. In step r10, it is checked whether or not the negative pressure Pb of the intake pipe is equal to or less than MAP (Ne, $\theta_s$) shown in FIG. 4(a). When Pb is equal to or less than MAP, the engine control unit ECU 32 confirms the absence of the mode change trouble, and goes to step r11. In step r11, the timer TIM6 is reset. Conversely, when Pb is above MAP, the logic flow proceeds to step r12. Then, the trouble confirming flag F1 is set to 1. Thereafter, the logic flow goes to step r13. When the time period counted by the timer TIM6 is shorter than a reference time period TNG indicative of a time period for confirming the presence of the mode change trouble, the logic flow returns to the main routine. Conversely, when time period counted by the timer TIM6 is longer than TNG, the engine control unit ECU 32 confirms the presence of the mode change trouble, issues a trouble present signal, and returns to the main routine.

Alternatively, the trouble present signal may be issued immediately after the flag F1 becomes 1.

Figure 8:
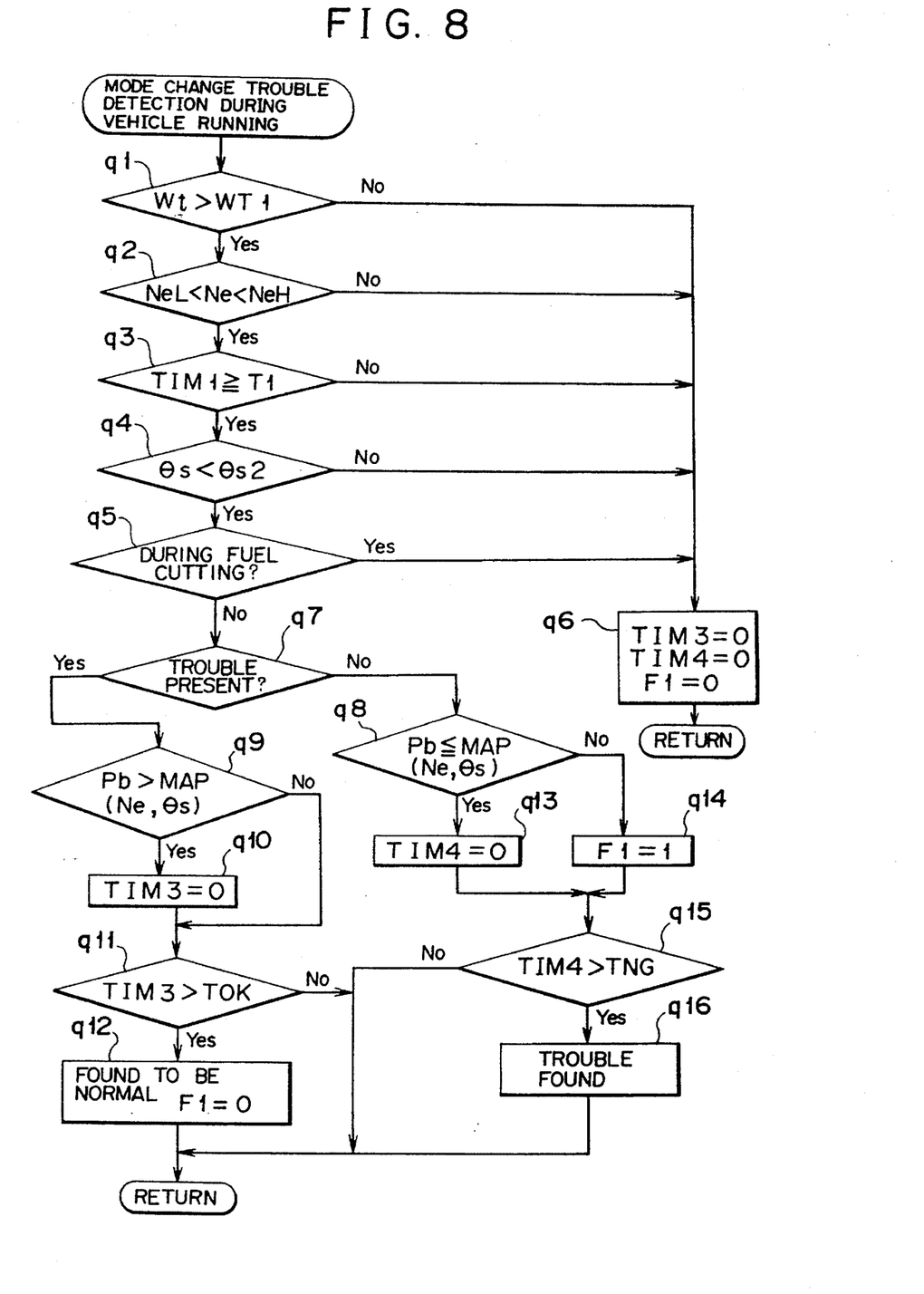
FIG. 8 is a flowchart of an engine trouble detecting routine while the vehicle is running.

When the logic flow proceeds to step s9 in the mode change trouble detecting and processing routine shown in FIG. 6, the engine control unit ECU 23 performs a routine shown in FIG. 8. This routine is for detecting and processing the mode change trouble while the vehicle is running.

In step q1, the engine control unit ECU 32 checks whether or not the current water temperature WT is above the reference water temperature WT1 at which the mode change trouble confirmation is initiated. The logic flow goes to step q6 when WT is below WT1. Once WT is above WT1, the logic flow proceeds to step q2. In step q6, the timer TIM3 for counting a time interval for confirming the absence of the mode change trouble is reset, and the timer TIM4 for counting a time period for confirming the presence of the mode change trouble is also reset. The trouble confirming flag F1 is reset. Then, the engine control unit ECU 32 returns to the main routine.

When WT is above WT1, the logic flow goes to step q2. In step q2, it is checked whether or not the current engine speed Ne is between minimum and maximum engine speeds NeL and NeH (i.e. NeL<Ne< NeH) which are threshold values used to decide whether the mode change trouble confirmation is started while the vehicle is running. When Ne is between NeL and NeH, the logic flow proceeds to step q3. Otherwise, the logic flow goes to step q6.

In step q3, it is checked whether or not the timer TIM1 has counted the time period T1 for confirming that the engine operation is normal. When the time period counted by the timer TIM1 is shorter than T1, the logic flow goes to step q6. Otherwise, the logic flow goes to step q4.

In step q4, when the current throttle opening $\theta_s$ is below a maximum throttle opening $\theta_{s2}$ indicative of a maximum throttle opening to be used to determine whether a mode change trouble is present while the vehicle is running, the logic flow goes to step q5. Conversely, when $\theta_s$ is larger than $\theta_{s2}$, the throttle opening is considered to be substantially full, and the logic flow goes to step q6 so as to cancel the mode change trouble confirmation.

In step q5, it is checked whether or not fuel cutting is in progress. When fuel cutting is in progress, the logic flow goes to step q6. Otherwise, the logic flow proceeds to step q7.

In step q7, it is checked whether or not there is a mode change trouble. When the mode change trouble is present, the logic flow goes to step q9. In step q9, it is checked whether or not the negative pressure Pb of the intake pipe is above MAP (shown in FIG. 4(b)). When Pb> MAP, the logic flow goes to step q10. Then, the timer TIM5 is reset. When Pb< MAP, the logic flow goes to step q11. The negative pressure MAP depends upon a current engine speed and throttle opening in the full cylinder operation mode, and is used as a criterion for determining the mode change trouble. In step q11, when the time interval counted by the timer TIM3 is below TOK (the reference time period for confirming that the operation mode change has been normally performed), the logic flow returns to the main routine. Conversely, when the time period counted by the timer TIM3 is above TOK, the mode change trouble is considered to be cleared. Then, the flag F1 is reset, and the logic flow returns to the main routine.

When it is confirmed in step q7 that there is no mode change trouble, the logic flow goes to step q8. In step q8, it is checked whether or not the negative pressure Pb is equal to or below MAP (Ne, $\theta_s$) shown in FIG. 4(b). When Pb≦MAP, the logic flow goes to step q13. In step q13, a time period counted by the timer TIM4 (to confirm the presence of the mode change trouble while the vehicle is running) is reset. Then, the logic flow goes to step q15. Conversely, when Pb> MAP, the logic flow goes to step q14. Then, the flag F1 is set to 1, and the logic flow goes to step q15. In step q15, when a time period counted by the timer TIM4 is below TNG (indicative of the time period for confirming the presence of the mode change trouble while the vehicle is running), the logic flow returns to the main routine. On the other hand, when the time counted by the timer TIM4 is above TNG, it is confirmed that the mode change trouble is present, so that the trouble present signal will be issued. Then, the logic flow returns to the main routine.

Alternatively, the trouble present signal will be issued immediately after the flag F1 becomes 1.

As described above, when the current negative pressure Pb of the intake pipe is below MAP (corresponding to the engine speed Ne and the throttle opening $\theta_s$), the partial cylinder operation mode is considered to be normally changed over to the full cylinder operation mode. Otherwise, it is considered that there is a mode change trouble, and the trouble present signal will be issued. This signal is received in step f5 of an injector actuating routine shown in FIG. 9. In step f7, only the drivers for the cylinders #2 and #3 are actuated, so that no fuel will be supplied to the inactive cylinders #1 and #4. Thus, the inactive cylinders can be protected against any damage caused when there is a mode change trouble.

In the invention, the mode change confirming unit confirms whether or not the partial cylinder operation mode is successfully changed over to the full cylinder operation mode by the valve change-over units. When the signal issued by the mode change confirming unit indicates the incomplete operation mode change, the fuel control unit forcibly actuates the fuel supply unit in the partial cylinder operation mode. In such a case, the fuel control unit can interrupt fuel supply to the disconnected cylinders. Thus, even when there is incomplete operation mode change by the valve change-over unit, it is possible to prevent troubles in which fuel supplied to the disconnected cylinders would go into the continuously active cylinders via the surge tank and damage pistons or connecting rods therein.

Industrial Applicability

In this fuel control device of the invention, the valve system of the engine allows intake and exhaust valves thereof to be selectively activated or de-activated in either the full or partial cylinder operation mode according to operation conditions of the engine. Therefore, the fuel control device is effectively applicable to a vehicle engine which has disconnectable groups of cylinders and is required to be durable.

What is claimed is:

1. A fuel control device for an engine having disconnectable groups of cylinders, comprising:

valve change-over means for selectively activating or de-activating at least either intake or exhaust valves of the engine;

operation mode selecting means for selecting either a partial cylinder operation mode or a full cylinder operation mode, in which the intake or exhaust valves are selectively activated or de-activated, as a target operation mode on the basis of engine operating information;

valve change-over control means for selectively operating the valve change-over means so as to operate the engine in the target operation mode selected by the operation mode selecting means;

fuel supply means for selectively supplying fuel to engine cylinders according to the selected target operation mode;

mode change confirming means for confirming whether or not the partial cylinder operation mode is reliably changed by the valve change-over means over to the full cylinder operation mode, and issuing a mode change confirming signal; and fuel supply control means for controlling the fuel supply means to operate in the partial cylinder operation mode when the operation mode selecting means selects the full cylinder operation mode as the target operation mode and when the mode change confirming signal issued by the mode change confirming means indicates incomplete change-over from the partial cylinder operation mode to the full cylinder operation mode.

2. A fuel control device as in claim 1, wherein the mode change confirming means includes operational parameter detecting means for detecting current operational parameters of the engine and operational parameter storing means for storing, in advance, operational parameters obtained under varying operational conditions of the engine in the full cylinder operation mode, so that operational parameters obtained under the operational condition corresponding to the operational condition under which the operational parameter detecting means actually detects the current operational parameters can be read from the stored operational parameters, and wherein the mode change confirming means compares the current operational parameter detected by the operational parameter detecting means with the operational parameter read from the operational parameter storing means, thereby confirming whether or not the partial cylinder operation mode has been completely changed over to the full cylinder operation mode by the valve change-over means.

3. A fuel control device as in claim 2, wherein the mode change confirming means includes: a negative pressure sensor for detecting a negative pressure of an intake pipe; a throttle opening sensor for detecting opening of a throttle valve of the engine, and an engine speed sensor for detecting an engine speed, and wherein a negative pressure represents an engine operational parameter, and throttle valve opening and an engine speed represent engine operating conditions.

4. A fuel control device as in claim 1, wherein the mode change confirming means further includes engine operating condition detecting means for detecting operating conditions of the engine, and suspends to confirm the mode change when the detected engine operating conditions meet predetermined requirements for suspending the mode change confirmation.

5. A fuel control device as in claim 4, wherein the engine operating condition detecting means detects a temperature of the engine, and the mode change confirming means suspends to confirm the mode change when the detected engine temperature is below a preset reference value.

6. A fuel control device as in claim 4, wherein the mode change confirming means further includes running condition checking means for checking whether or not a vehicle carrying the engine is running, and predetermined requirements for suspending to confirm the mode change are differentiated according to whether or not the vehicle is running.

7. A fuel control device as in claim 4, wherein the engine operating condition detecting means detects a status of a load applied to the engine, and the mode change confirming means includes running condition checking means for checking whether or not the vehicle is running, and suspends to confirm the mode change when the vehicle is not determined to be running and when the load is being applied to the engine.

8. A fuel control unit as in claim 4, wherein the load is applied by an air-conditioner.

9. A fuel control unit as in claim 4, wherein the engine operating condition detecting means detects a throttle opening of the engine, and the mode change confirming means includes running condition checking means for checking whether or not the vehicle is running, and suspends to confirm the mode change when the vehicle is not running and when the detected throttle opening is larger than a preset reference value.

10. A fuel control unit as in claim 4, wherein the engine operating condition detecting means detects an engine speed, and the mode change confirming means further includes running condition checking means for checking whether or not the vehicle is running, and suspends to confirm the mode change when the vehicle is not determined to be running and when the detected engine speed is not in a predetermined reference range.

11. A fuel control unit as in claim 4, wherein the fuel supply means interrupts fuel supply to cylinders according to the operating condition of the engine, the engine operating condition detecting means detects the interruption of fuel supply by the fuel supply means, and the mode change confirming means further includes running condition checking means for checking whether or not the vehicle is running, and suspends to determine the mode change when the vehicle is not determined to be running and when fuel cutting is in progress.

* * * * *